Aug. 4, 1959  C. W. DROMGOLD  2,897,827
PIPELINE WASHING APPARATUS
Filed Oct. 22, 1954
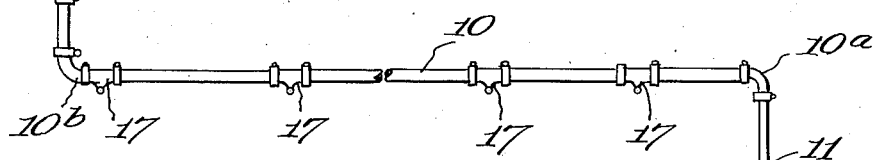
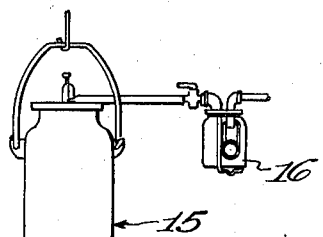
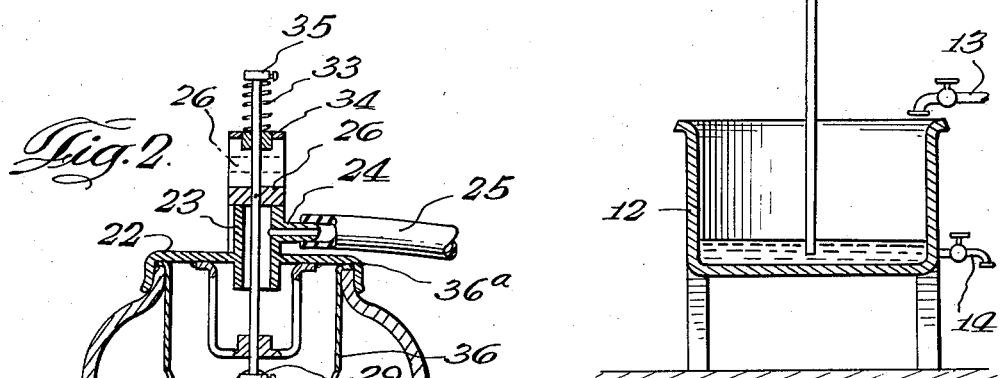
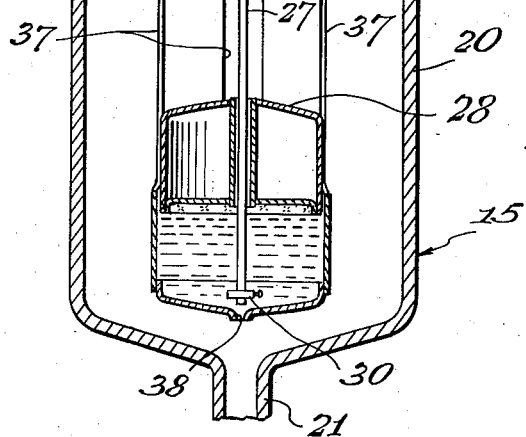
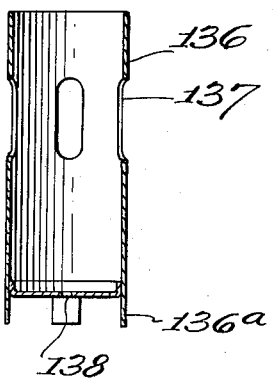
INVENTOR.
Clarence W. Dromgold
BY
Schroeder, Hofgren, Brady & Wegner
attorneys

2,897,827
PIPELINE WASHING APPARATUS
Clarence W. Dromgold, Centralia, Ill.

Application October 22, 1954, Serial No. 463,855

3 Claims. (Cl. 134—56)

This invention is concerned with an apparatus for washing a pipeline, and more particularly for washing a milk carry-away pipeline.

Carry-away milking systems in which the milk withdrawn from the animal is delivered to a pipeline and flows therethrough into a suitable storage tank or the like located remotely from the animal being milked as contrasted from systems where the milk is delivered directly to a bucket or other container located at or near the animal are coming into more and more widespread use. In general, in carry-away systems, a stainless steel or in some cases a glass pipeline extends along the stalls or around the parlor in which the milking is conducted, the particular configuration of the pipeline depending on the layout of the parlor. It is necessary, however, after each milking operation that the milk contacted portions of the carry-away pipeline be thoroughly washed and sanitized. In some instances the pipelines are completely disassembled and the sections thereof individually washed and then reassembled. This, of course, is a laborious and time consuming operation. As a result, a number of systems and methods have been devised for so-called "in place" washing of milk carry-away pipelines; that is, for washing the pipeline while it remains completely assembled and in place in the barn or milking parlor. I have devised an improved washing method and apparatus for use with certain types of washing systems.

One feature of the invention is that it provides an apparatus for flushing a pipeline which comprises means for filling the pipeline with the washing solution, ceasing filling when the pipeline is full, emptying the washing solution from the pipeline, and repeating the previous steps.

Another feature is an apparatus for flushing a milk pipeline comprising means for applying a vacuum to a pipeline to cause filling thereof with a washing solution, interrupting the vacuum when the pipeline is completely filled, emptying the wash solution from the pipeline, and reapplying the vacuum to the line only after the washing solution is substantially completely emptied therefrom.

Still another feature is the provision, in an apparatus for washing a carry-away milk pipeline in which a washing solution is flushed back and forth under the alternate influence of vacuum and atmosphere, of means for periodically venting the pipeline to atmosphere for a period sufficient to permit complete draining of the washing solution from the pipeline.

A further feature is the provision in a system wherein a receptacle is provided with an outlet having an elongated drainage system connected thereto, the filling and emptying of the receptacle being controlled by a float responsive to the level of liquid therein, of means for effecting complete emptying of the receptacle and drainage system comprising an auxiliary chamber surrounding the float and in fluid communication with the receptacle, the auxiliary chamber having only a restricted outlet opening, preventing the drainage of liquid therefrom for a period of time sufficient to permit substantially complete emptying of the drainage system.

Further features and advantages will be apparent from the following specification and from the drawings in which:

Figure 1 is a diagrammatic view illustrating a milk pipeline washing system with which the invention may be used;

Figure 2 is a vertical sectional view of a washing control unit embodying the invention; and Figure 3 is a vertical sectional view of a modified drainage control element.

Although the invention is described herein as applied to a particular washing system and it has certain special advantages in connection with such system, it will be understood that it may also be advantageously incorporated in many other washing systems.

Referring now to Figure 1 of the drawings, a milk pipeline 10 is illustrated as connected for a washing operation. The pipeline 10 is shown diagrammatically in Figure 1 and it will be understood that in practice it may extend along a row of parlor stalls or around the periphery of a stanchion barn or may take many other configurations depending upon the particular application. One end 10a of the pipeline is provided with a conduit 11 extending into a reservoir 12 which contains a quantity of a suitable washing solution. A tap 13 is provided for filling the reservoir 12 and a drain 14 for emptying it. The opposite end 10b of the pipeline is connected through a washing control apparatus indicated generally as 15 and a liquid trap 16 to a suitable source of vacuum (not shown). A plurality of suitable stall cocks 17 are provided at intervals along the pipeline and are normally closed during the washing operation.

During milking, of course, the connection of the pipeline 10 is somewhat altered and in this particular instance the end 10b of the pipeline would be capped and the end 10a connected through suitable milk releasing apparatus to a source of vacuum. The milk lines from the individual milk withdrawing units would be connected to the stall cocks 17.

Returning now to the washing operation, the washing control apparatus 15, as will appear more fully later, first applies a vacuum to the end 10b of the pipeline causing washing solution to be drawn from the reservoir 12 through the pipe 11 filling pipeline 10. The vacuum is then interrupted and the washing solution permitted to drain from the pipeline back into the reservoir 12 after which the operation is repeated.

Referring now to Figure 2, it will be seen that the control apparatus 15 includes an outer receptacle 20 having an outlet 21 at the bottom thereof and connected to the end 10b of pipeline 10. A cover 22 sealingly closes the receptacle 20 and is provided with a tubular member 23 extending therethrough. A nipple 24 on the side of the tubular member 23 is connected by a suitable hose 25 to the source of vacuum. A valve 26 closes the upper end of tubular member 23, outside receptacle 20, and is mounted on a valve operating member or rod 27 which extends down into the interior of the receptacle 20 and has a float 28 slidably mounted thereon. A pair of collars 29 and 30 are adjustably carried upon valve operating rod 27, one above and the other below the float, respectively. The valve operating member 27 is normally biased upwardly, toward open position, by a spring 33 seated on a bracket 34 mounted on the top of the receptacle lid 22 and bearing against a collar 35 affixed to the rod.

An auxiliary chamber 36 is supported within the receptacle 20 by an outwardly flanged lip 36a at the upper end thereof which is secured between the edge of receptacle 20 and cover 22, the float 28 being positioned within the auxiliary chamber. The auxiliary chamber 36 is provided with a plurality of large elongated inlet openings 37 in the upper portion thereof, communicating with the interior of receptacle 20 and only a single restricted outlet 38 at the bottom thereof.

Ignoring for the time being the effect of the auxiliary chamber 36, at the start of a washing operation after the receptacle 12 is filled with the appropriate washing solution (normally the pipeline is first flushed with cold water, then washed with a hot detergent solution, and finally rinsed with a sanitizing solution), vacuum is applied to the control apparatus 15. The float 28 is at this time resting on the lower collar 30 as there is no liquid in the receptacle 20 and the weight thereof is sufficient to overcome the action of spring 33 and valve 26 will be seated on the upper end of tube 23 closing it and permitting the vacuum to be applied to the pipeline 10. The washing solution is drawn from the reservoir 12 through the pipeline and into receptacle 20 which begins to fill, raising the float from the collar 30. The effect of the vacuum on the underside of valve 26 is adequate to keep this valve seated while the receptacle 20 fills. When the level of liquid in the receptacle raises float 28 far enough to contact collar 29, valve 26 is lifted from its seat on tubular member 23 against the action of the vacuum therewithin and receptacle 20 is vented to atmosphere. The washing solution then drains from the receptacle 20 through pipeline 10, back into reservoir 12. As the float 28 drops away from upper collar 29, the action of bias spring 33 keeps valve 26 open. When the float again rests on collar 30, valve 26 closes and the procedure is repeated, the washing solution in the pipeline surging back and forth therethrough for a suitable period of time.

Again recalling that the action of auxiliary chamber 36 is presently being disregarded, it will be seen that as the liquid flows from the receptacle 20, float 28 falls only until it strikes collar 30 closing valve 26, reapplying vacuum to the system. Thus, the pipeline 10 is always full of washing solution. While this system has proved quite satisfactory for washing milk pipelines, it has been found that the washing must be carried on for a substantial period of time in order to clean adequately the small crevices and the like found at the joints in the pipeline and at the cocks 17. These crevices fill up with washing solution which becomes stagnant and as a result does not wash as effectively as the washing solution which flows back and forth through the line.

The auxiliary chamber 36 which surrounds the float 28 has the effect of delaying the re-application of vacuum to the pipeline during the draining portion of the cycle for a period sufficient to permit substantially all of the washing solution in the pipeline to drain therefrom, thus permitting all the small crevices therein to drain and preventing formation of stagnant pockets of washing solution. As the receptacle 20 fills with washing solution during the first portion of the washing cycle, the auxiliary chamber 36 will also be filled through the inlet openings 37 and, to a small extent, through the outlet opening 38, raising the float 28 as heretofore described. After valve 26 is opened and the washing solution drains from the receptacle 20, a quantity of the washing solution will be trapped in the lower end of auxiliary chamber 36 as it can drain therefrom only through the restricted outlet opening 38, preventing float 28 from contacting collar 30 and closing valve 26. The duration of the delay may be adjusted by properly positioning collar 30 and by varying the size of opening 38, to permit complete draining of pipeline 10 before it is refilled. The time necessary will, of course, depend upon the length of the pipeline and the pitch thereof.

In addition to preventing the formation of stagnant pockets of washing solution it has been found that periodically emptying the pipeline has other advantages. The initial and terminal portions of a column of liquid have a greater washing effect than a steady flow and as a result, the entire pipeline is washed more quickly and efficiently by the present method than was heretofore possible.

Figure 3 illustrates a modified form of auxiliary chamber 136 which is provided with a plurality of legs 136a designed to rest on the bottom of receptacle 20, supporting it therein. A plurality of large inlet openings 137 are formed in the wall of chamber 136 near the upper end thereof and a small restricted outlet opening 138 is provided in the bottom.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A milk pipe line washing system of the character described, comprising: a receptacle having an outlet adapted to be connected to the milk pipe line; means for periodically applying vacuum to said receptacle and venting said receptacle to atmosphere to flush a washing solution back and forth through the pipe line and into said receptacle; a float responsive to the level of washing solution in said receptacle for controlling the application and venting of vacuum therein; and an auxiliary chamber surrounding said float and in fluid communication with said receptacle through an inlet opening, said auxiliary chamber having a single outlet opening for delaying the application of vacuum to the system to permit complete emptying of the pipe line, said outlet opening being a constantly open restricted outlet of a predetermined amount smaller than said receptacle outlet.

2. In a vacuum operated milk pipeline washing system wherein vacuum is periodically applied to the line and the line is alternately vented to atmosphere to flush a washing solution back and forth therethrough and wherein a float responsive to the level of washing solution in a receptacle connected to the end of said pipeline controls the application of vacuum to and the venting of said system, means for effecting complete emptying of said pipeline, comprising an auxiliary chamber surrounding said float and having large inlet opening means at the top thereof and in communication with said receptacle and having only a restricted outlet opening at the bottom thereof.

3. Line washing control apparatus as set forth in claim 2, wherein said auxiliary chamber is positioned within said receptacle.

References Cited in the file of this patent

UNITED STATES PATENTS

| | | |
|---|---|---|
| 373,546 | Worthington | Nov. 22, 1887 |
| 1,529,334 | Winkeleer | Mar. 10, 1925 |
| 1,645,356 | Shurts | Oct. 11, 1927 |
| 1,863,755 | Lodde | June 21, 1932 |
| 2,240,364 | Kimball | Apr. 29, 1941 |
| 2,592,908 | Katz | Apr. 15, 1952 |
| 2,603,227 | Paxton | July 15, 1952 |
| 2,733,667 | Hill | Feb. 7, 1956 |